United States Patent [19]

Takemoto

[11] Patent Number: 4,937,843

[45] Date of Patent: Jun. 26, 1990

[54] DIGITAL DATA BLOCK SYNCHRONIZER

[75] Inventor: Sohei Takemoto, Fremont, Calif.

[73] Assignee: Ampex Corporation, Redwood City, Calif.

[21] Appl. No.: 143,996

[22] PCT Filed: Mar. 27, 1987

[86] PCT No.: PCT/US87/00729

§ 371 Date: Nov. 25, 1987

§ 102(e) Date: Nov. 25, 1987

[87] PCT Pub. No.: WO87/06086

PCT Pub. Date: Oct. 8, 1987

Related U.S. Application Data

[63] Continuation-in-part of Ser. No. 845,597, Mar. 28, 1986, abandoned.

[51] Int. Cl.$^5$ .............................................. H04L 7/10
[52] U.S. Cl. ...................................... 375/116; 371/36
[58] Field of Search ............... 375/106, 114, 116, 119, 375/108, 40; 371/6, 36

[56] References Cited

U.S. PATENT DOCUMENTS

| | | | |
|---|---|---|---|
| 4,112,498 | 9/1978 | Reiner et al. | 375/114 |
| 4,214,124 | 7/1980 | Jarus | 375/114 |
| 4,598,413 | 7/1986 | Szèchènyi | 375/119 |
| 4,703,479 | 10/1987 | Ikeda | 375/40 |

*Primary Examiner*—Douglas W. Olms
*Assistant Examiner*—Marianne Huseman
*Attorney, Agent, or Firm*—Elizabeth E. Strnad; Douglas M. Gilbert

[57] ABSTRACT

A method and apparatus detects synchronizing sequences in a digital data stream. The apparatus comprises a plurality of candidate sequence generators and associated vote counters which are used in conjunction with comparators to test the order of received synchronizing symbols of a predefined sequence of predefined symbols against a plurality of corresponding candidate symbols of candidate sequences. A candidate generators begins a new candidate sequence when an ambiguity in the input symbol sequence is detected, i.e., when a received symbol does not match a candidate symbol of one of the previous candidate sequences. The apparatus includes a voter decision logic circuit which selects a winner among the candidates based upon the number of votes or matches tallied for each candidate sequence. The implementation illustrated is a seven-trial, three-candidate system with provisions for a minimum vote threshold before selection and a landslide selection upon a candidate sequence accruing a predetermined number of votes.

15 Claims, 9 Drawing Sheets

*IF VOTE TALLY ≧ PASSING VOTE, OR DECLARE LANDSLIDE IF VOTE TALLY ≧ PASSING VOTE AND VOTE TALLY ≧ LANDSLIDE VOTE

3-CANDIDATE, 7-TRIAL METHOD

PASSING VOTE = 1
LANDSLIDE VOTE = 2

| | | | |
|---|---|---|---|
| 1ST | 6 (H) | 0 1 1 0 | SELECT BUFFER 118 |
| 1ST LANDSLIDE | 7 (H) | → 0 1 1 1 | SELECT BUFFER 118 CLEAR LATCH 138 |
| 2ND | A (H) | → 1 0 1 0 | SELECT BUFFER 116 |
| 2ND LANDSLIDE | B (H) | → 1 0 1 1 | SELECT BUFFER 116 CLEAR LATCH 138 |
| 3RD | C (H) | → 1 1 0 0 | SELECT BUFFER 114 |
| 3RD LANDSLIDE | D (H) | → 1 1 0 1 | SELECT BUFFER 114 CLEAR LATCH 138 |
| NONE | E (H) | 1 1 1 1 | DO NOTHING |

| ROM | LATCH | CANDIDATE COUNTER 1 | CANDIDATE COUNTER 2 | CANDIDATE COUNTER 3 |
|---|---|---|---|---|
| 0 (H) | 0 0 0 | X | X | X |
| 1 (H) | 0 0 1 | X | X | + |
| 2 (H) | 0 1 0 | X | + | X |
| 3 (H) | 0 1 1 | X | + | + |
| 4 (H) | 1 0 0 | + | X | X |
| 5 (H) | 1 0 1 | + | X | + |
| 6 (H) | 1 1 0 | + | + | X |
| 7 (H) | 1 1 1 | + | + | + |

X = AVAILABLE
+ = OCCUPIED
(VALID CANDIDATE)

Fig. 13

DIGITAL DATA BLOCK SYNCHRONIZER

This is a continuation-in-part of U.S. application Ser. No. 845,597, filed Mar. 28, 1986 and now abandoned.

The present invention pertains generally to the synchronization of a digital data stream, and is more particularly directed to the accurate recovery of information in a data stream received from a transmission channel.

In data transmissions systems, there is a need for synchronization of the data in order to successfully recover the information transmitted in the data stream. Generally, in the past, many systems have appended synchronization sequences to the beginning of respective information data blocks to facilitate this task. Recovery is achieved by recognizing a synchronization sequence and identifying the end of the sequence. Once the synchronization data indicating the end of a sequence have been identified, the information data block is identified as those data which follow the sequence over a predetermined interval.

It is difficult to detect the synchronizing sequence of a transmitted data stream reliably because the sequence itself may be partly affected by transmission errors. Of course the problem of detecting the synchronizing sequence becomes more difficult with higher data rates. While longer sequences increase the probability of being able to detect the transmitted sequence, an increase in the length of the sequence also increases the probability that one or more of its constituent parts may be received differently from the manner in which it was transmitted.

In general, each of these synchronizing sequences is comprised of a set of predefined characters or symbols which occur in a time ordered sequence. With such a technique, if a particular character is received which is not in the character set, then it can be immediately discarded as not part of the sequence. However, there is an inherent ambiguity in the method when a received symbol is one of the characters in the set, but out of the correct order. It is ambiguous as to whether the preceding symbols are in error or the presently received symbol is in error. Therefore, to detect a synchronization sequence of this type reliably, it is necessary to provide means for resolving this ambiguity.

While the invention described herein is compatible with any digital data stream transmission system, it has specific utility in recording and reproducing data with magnetic tape record/reproduce devices. In recently developed helical scan magnetic tape record/reproduce devices for digitized television signals, the same tracks on the magnetic tape include video and audio data separately recorded at spaced locations along each track. The video data account for as much as 90% of the data recorded on a track, and the audio data represent only a small part of the data on each track. The synchronization sequence included in the audio data may be different and without the benefit of the repetitiveness that is the case in synchronization sequences included in the video data.

Thus, a reliable sequence detection system different from that used in video recovery must be used to recover audio data successfully. An audio recovery system should be able to recover a synchronization sequence in one pass because there are no, or only a few, repetitions of the sequence for the audio data, and it should be reliable as it must detect a relatively short sequence of data.

Further, such system should be able to discriminate between false synchronizing sequences which contain a partial string of synchronizing sequence symbols in the correct order, and actual synchronizing sequences which are in the correct order but have some symbol errors included therein. Because the magnetic recording and reproducing medium is likely to have been recorded previously, there is a possibility that partial synchronization sequences (previously recorded sequences which have been overwritten but not completely erased) will be detected, and this possibility should be excluded by conclusively identifying a complete correct sequence for the presently recovered information, in spite of some of the sequence symbols being in error.

SUMMARY OF THE INVENTION

Therefore, it is an aspect of the present invention to detect a synchronization sequence of a digital data stream reliably even though the sequence may contain some errors.

It is a further aspect of the invention to synchronize the timing of a data block to which a synchronization sequence is appended by generating a timing signal relative to the detected synchronization sequence.

Accordingly, the invention provides a method and apparatus for reliably detecting the synchronizing sequence of a digital data stream. A plurality of successive different synchronizing symbols in a predetermined sequence are introduced into a data stream for transmission therewith. The synchronizing sequence occupies a predetermined interval upstream of a data block whose timing is to be synchronized. At the receiver, symbols or characters corresponding to those forming the sequence are detected and identified in the received data stream to identify the transmitted synchronizing sequence. The identification of the synchronizing sequence permits the generation of a synchronizing pulse relative to the end of the identified sequence which marks the start of the downstream data block.

The method includes testing received symbols corresponding to those forming the synchronizing sequence by an arbitration technique to determine whether they are in time positions corresponding to the time positions for such symbols in the predetermined transmitted synchronizing sequence. The testing is accomplished by a comparison method wherein a series of candidate sequences of symbols is generated, and symbols in the received sequence are compared with symbols in each candidate sequence to determine the sequence most likely to correspond to the transmitted sequence. In general, the comparison technique includes generating symbols in the predetermined sequence, commencing with a chosen candidate symbol. Thus, a comparison of the generated candidate sequence with the received sequence should provide a match for each symbol in each time position, if the candidate symbol be in the correct time position. Initially, the first received symbol identified as a valid symbol is used as a first candidate and other candidates are produced by ambiguities developed in the matching procedure. There is an ambiguity when a received valid symbol does not match any symbols at corresponding places in the test sequences of the previous candidates.

When the candidate sequences are compared to the sequence of received symbols, a match between a received symbol and a symbol of a candidate sequence is tallied for each matched candidate sequence. The number of matches or votes tallied for each respective candidate sequence is then compared with the number for each of the other candidate sequences in a logic (arbitration) program to determine which candidate sequence is most likely to correspond to the predetermined sequence entered into the transmitted data stream. From the timing of the candidate sequence determined most likely, end of the predetermined sequence is inferred and a timing signal is generated to identify the start of the following block of information data.

In one embodiment, this method is implemented in a seven-trial, three-candidate voting system wherein the synchronizing sequence includes a predetermined sequence of symbols representing countdown sequence of numbers from 6 to 0. As the synchronizing sequence enters a sequence detection system, the first symbol which is recognized as a symbol corresponding to one of those forming the predetermined sequence causes a control means to load a first counter with a number corresponding to that represented by the first symbol. Thereafter, the counter counts from the number represented by the first symbol at a rate corresponding to the rate of receipt of the symbols to generate a candidate sequence. Because of the ambiguity of being the first recognized symbol, all that is known is that the first symbol should be tested to determine if it is part of the transmitted predetermined sequence. Being a recognized symbol, it identifies a candidate symbol representing a particular location or time order in the predetermined sequence. If the candidate symbol in fact represents a sequence corresponding to the transmitted predetermined sequence, the succeeding received symbols should correspond to the succeeding symbols in the candidate sequence. In such event, the first counter counts down to the final number in the sequence, in this case zero, at the same time a symbol representing the final number is received.

Each of the successively received symbols is compared with the first candidate sequence and, when a match does not occur, another counter is loaded by the control means with a number representing the received symbol not matching the first candidate sequence. Each such counter also counts in the predetermined sequence in the same manner described with reference to the first counter. In a similar manner, the following received symbols are detected and matched with the candidate sequences and, when a match does not occur, a third counter is loaded by the control means and then counts to generate a third candidate sequence.

In the preferred embodiment, the control means executes a logic program to determine which symbols cause loading or clearing of the candidate counters, and when. Further, the control means clears the associated counter when a new candidate is loaded into the counter. The control means chooses a candidate when a valid symbol is received and no match of that symbol to the symbols of the prior candidate sequences is made, providing a candidate counter is available. The logic program also contains logic for controlling the contents of the candidate counters based on special conditions, such as a candidate sequence reaching a final count symbol or a candidate sequence being selected as the most likely to represent the candidate predetermined sequence. The logic of the control means is advantageously implemented in a read only memory (ROM) wherein the input criteria (matches, valid data, candidate selection, final symbol generation, availability for counters, etc.) address the memory to output control signals to the candidate and vote counters from the contents of a memory location. This implementation provides a facile method for changing the standards for candidate symbol choice by reprogramming the ROM.

Thus, as the three counters count down from the numbers represented by the received symbols, their contents are compared with the received symbols to determine if there be a match between each received symbol and the candidate sequences represented by the contents of the counters. Each match is determined by a comparison circuit and tallied in separate vote counters, each associated with a candidate counter. The outputs of the vote counters are transmitted to a decision logic circuit which determines on the basis of the tallied votes which of the sequences among the candidates is the most likely to correspond to the predetermined sequence included in the transmitted data, i.e., it elects a winner. When a candidate has been declared or elected a winner, its final sequence symbol is used as an indication that the end of the synchronizing sequence interval has occurred in the received data and that an information data block follows. A synchronization timing pulse is generated relative to the occurrence of the final symbol to mark the initiation of the data block for the received information.

In the preferred embodiment, the decision logic circuit executes a logic program which first determines which candidate has the most votes from among the choices and elects a winner based on that criterion. The logic program also contains logic for making decisions on selecting a candidate based on special conditions such as ties in the tallied votes, minimum passing votes, and landslide votes. The logic of the decision logic circuit is advantageously implemented in a read only memory (ROM) wherein the input criteria (votes, etc.) address the memory to output the selection of a candidate from the contents of a memory location. This implementation provides a facile method for changing the selection standards of the candidates by reprogramming the ROM.

The preferred system disclosed is a seven-trial, three-candidate system which arbitrates based on the number of votes for a maximum of three candidates which is the most likely candidate to represent a transmitted synchronizing seven symbol sequence. The number of symbols in a sequence determines the maximum number of possible votes for a candidate, six in the example. The number of trials and number of candidates chosen to implement a system are a function of the error rate of the transmission channel. While it is difficult to make an exact correlation between the number of trials and candidates needed for a particular error rate, statistical simulations of the system can be used with known error distributions for a transmission channel to arrive at an acceptable probability distribution of recovering the correct synchronizing sequence.

In general, the more symbols in a sequence (trials) and the more candidates allowed, the greater will be the probability of recovering the correct synchronizing sequence. Thus, candidates and trials may be added until the error rate is less than an acceptable level or reaches the point of diminishing returns. The number of candidates to be tested is selected according to the probability of receiving false symbols. There is a tradeoff of whether to add more candidates or more trials as the former increases circuitry for the synchronization detection system while the latter increases overhead in the transmitted data and increases the probability that at least some of the symbols will be transmitted in error.

Further, for systems where there is the possibility of recovering partial sequences, i.e., previously recorded sequences that have not been totally erased, a minimum vote count increases the probability of recovering the correct sequence. In the overall error rate, a simulation will indicate the probabilities of detecting the correct sequence if two, three, or more symbols must be detected in the correct order. Increasing the minimum number of votes a candidate must receive before being selected increases the probability that the detected sequence is correct. However, the tradeoff is that increasing the minimum vote reduces the chance for success in identifying sequence as the predetermined sequence in the received data.

These and other objects, features and aspects of the invention will become more apparent upon reading the following detailed description when taken in conjunction with the attached drawings.

DETAILED DESCRIPTION OF THE PREFERRED EMBODIMENT

Figure 1:
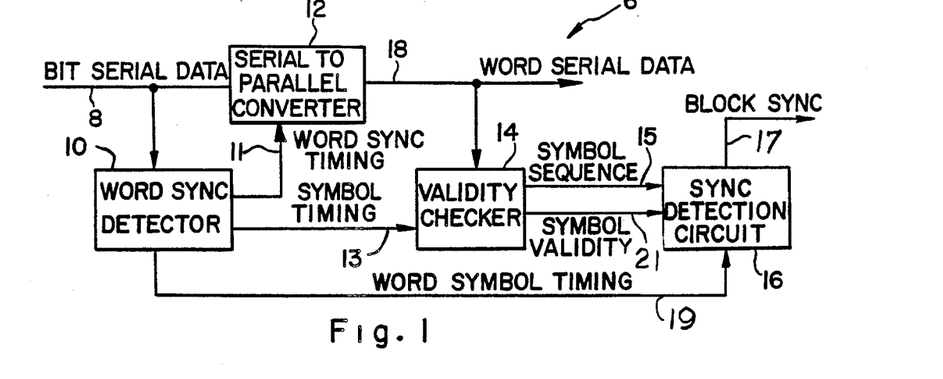
FIG. 1. is a system block diagram of a synchronization sequence detection system for a transmitted digital data stream which is constructed in accordance with the invention.
Figure 2:
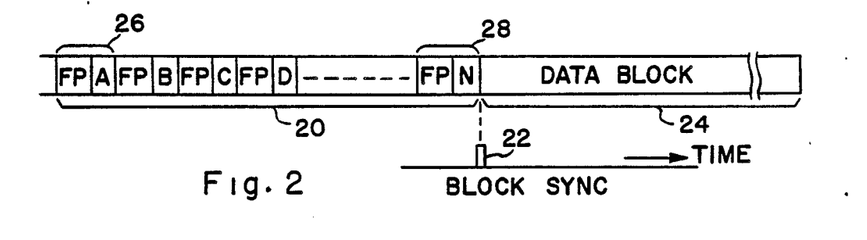
FIG. 2 is a pictorial representation of a digital serial data stream format including an initial synchronization sequence appended to an information data block.

FIG. 1 illustrates in block diagram form an implementation of a synchronization detection system 6 for a serial digital data stream which is constructed in accordance with the present invention. The generalized format of such serial data is illustrated in FIG. 2, where the data include alternate synchronization sequences 20 and information data blocks 24, with each synchronization sequence 20 being appended to a data block 24. These data packets are asynchronously or synchronously transmitted over a transmission channel 8 to the synchronization detection system 6, and the system responds to the received synchronization sequence 20 to generate a block sync pulse 22 to indicate the initiation of the data block 24. Circuitry or user devices (not shown) downstream of the synchronization detection system 6 receive the data stream via a data path 18 and use the block sync signal 22 to synchronize the recovery of the information data in data block 24.

The synchronization sequence 20 and the information data block 24 can be comprised of any number of intermediate bit divisions, but for convenience and compatibility with other data systems, they are generally separated into conventional byte or nibble format. Although the invention is applicable to any system which transmits serial digital data in the format shown in FIG. 2, the data format represented can be the audio portion of data as reproduced by a helical scan, magnetic tape record/reproduce apparatus.

Each synchronization sequence 20 included in the data stream comprises a plurality of sync units extending from a first unit 26 to a last unit 28. A sync unit consists of a fixed bit pattern (FP) and a character or a symbol, for example, A in the unit 26. The symbols differ throughout the sequence and are disposed in a predetermined order which can be selected for facile generation and recovery, for example, a countdown sequence 6, 5, 4, 3, 2, 1, 0. The fixed bit pattern has a suitable number of bits forming a sync pattern that can be identified in a data stream to indicate the word boundaries of the symbols and locate the respective symbols of the synchronizing sequence. The respective symbols, A, B, C, D, . . . N of the sync units are arbitrary but are all different and form a set in a unique predetermined sequence which can be identified by their order. Further, the synchronization sequence 20 by having a fixed bit pattern and symbols in a predetermined sequence, extends for a known interval. This assists in the recovery of the synchronization sequence with only a few valid symbols in the correct time order because, once a valid sequence is identified, the end of the sequence can be generated by timing circuitry. Also, if valid symbols be recovered early in the sequence, the subsequent part of the sequence may be in error and the detection still reliably made.

The respective symbols A, B, C, D, . . . N are represented by a suitable digital code using a suitable number of bits. The code is capable of checking the validity of the symbols because only symbols of the chosen set in the sequence are used. Because errors in a transmission channel can affect the reception of the sync data, this provides one check on the symbols to determine whether or not a correct synchronization sequence is being recovered. After the detection of the sequence of symbols, the data block 24 may be identified by the synchronization detection system 6 by generating the block sync signal 22 indicating that the synchronizing sequence 20 has been validly detected and that the following or subsequent date are is information data.

The format of the synchronization sequence illustrated in FIG. 2 assists in its successful recovery in a number of ways. Initially, the fixed bit pattern (FP) is sufficient in length to indicate reliably that a symbol follows. Each symbol A, B, C, D, . . . N is predefined such that if a symbol is recovered which is not in the known set, then the recovered symbol is known to be in error. Additionally, the symbols are in a predefined sequence such that if a valid symbol is identified, and it can be reliably validated that it is in the correct time position in the sequence, then the rest of the sequence can be generated because of its known order and time interval. Further, the known time interval permits the recovery of the sequence even if the subsequent or final symbols in the received sequence are in error. If the initial or even the middle symbols in the sequence can be identified as belonging to the set of symbols of the sequence, and in the correct time order, then the subsequent symbols can be generated. The length of the sequence can increase the probability that sequence can be reliably recovered because, the more symbols in the sequence, the higher the probability that at least a few will be validly received after transmission.

Returning to FIG. 1, the synchronization detection system 6 receives the serial data stream over the transmission channel 8 from a transmitter (not shown). The data stream is transmitted in the format shown in FIG. 2 and is presented to a serial to parallel converter 12. The serial to parallel converter 12 converts the serial data stream to parallel word form and outputs a serial stream of words on the data path 18 for the downstream utilization device. While the serial to parallel converter 12 could convert the bit serial data into any length of multi-bit word, in one embodiment of the invention, an 8-word (byte format) is used because such division will be more compatible with most utilization devices. In the disclosed embodiment, the synchronization units of the synchronizing sequence includes 36 bits of the FP data and 4 bits of symbol data, but could be other combinations of such. With this format, each synchronization unit is 5 bytes in length, and a total sequence is 35 bytes in length for a 7 symbol sequence.

The timing signals necessary to detect the boundaries of the words to be converted are produced by a word sync detector 10 which detects the occurrence of each fixed bit pattern (FP) and byte boundaries in the data stream and generates respective word sync timing signals via a conductor 11 to the serial to parallel converter 12. The output on the data path 18 is not only the synchronization units 26 . . . 28 in serial word format but also the data block 24 in serial word format. Further, from the detection of the fixed bit pattern (FP) in the data stream, the word sync detector 10 generates symbol timing signals on a line 13 to a validity checker 14. These signals indicate the boundaries of the synchronization symbols A, B, C, D . . . N and provide a differentiation of the symbols from the data in the data block 24.

The symbol timing signals on the line 13 permit the validity checker circuit 14 to extract the 4 bit symbols of the synchronization sequence from the word serial data stream on the data path 18. The validity checker circuit 14 also strips the symbols of the extra 4 bits of fixed pattern FP and verifies whether the symbols are part of the character set used in the transmitted sequence. The verification can be accomplished by a number of techniques. In the disclosed embodiment, the synchronization sequence is a countdown from "6" to "0" and only three bits are needed to generate these symbols. The fourth bit is used as odd parity to verify a correct or valid symbol "7" by the are converted to the unused symbol "7" by the validity checker 14. The symbols of the received sequence are received from the validity checker 14 by a synchronization detection circuit 16 via line 15 to determine the end of the synchronization signal 20 and to generate the block synchronization signal 22 on a line 17 to the subsequent utilization circuitry. The word symbol timing signals applied on a line 19 by the word sync detector 10 to the synchronization detection circuit 16 are a series of timed clock pulses based on the timing of the bit-serial data received on the transmission line 8 by the word sync detector 10.

Figure 3:
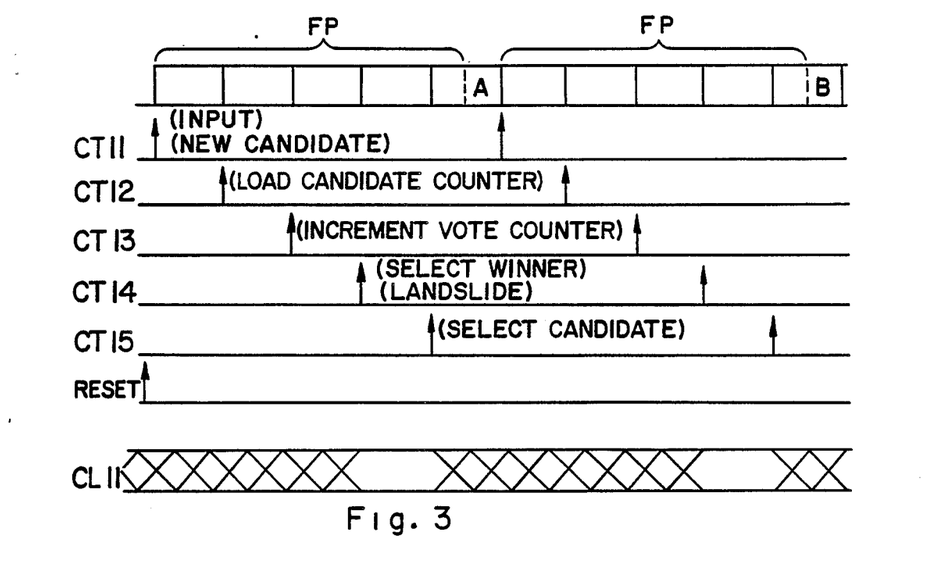
FIG. 3 is a timing diagram for an embodiment of FIG. 1, wherein the synchronization detection circuit illustrated in FIG. 9 operates according to a five phase clock.

FIG. 3 shows the generation of the word symbol timing signals CT11-CT15, and the signal from the word sync detector 10. The figure further illustrates that a symbol RESET validity signal CL11 is generated by the validity checker 14 and is applied to the synchronization detection circuit 16 over the line 21. A sync sequence unit 26 is divided into five 8-bit bytes where the fixed bit pattern (FP) is four-and-a-half bytes and the symbol A is a 4-bit half byte. The control signals CT11-CT15 are generated on the five byte boundaries of each sync sequence unit by the word sync detector 10. These word symbol timing signals form a five phase clock for moving data through the synchronization detection circuit 16 in one synchronization unit time period. The symbol validity signal CL11 is generated by the validity checker 14 subsequent to the CT11 signal, but prior to the CT15 timing signal. The CL11 signal indicates that the validity checker 14 has found an invalid symbol which should be disregarded. The initialization signal, RESET, precedes the first timing signal CT11 for the first received symbol. The circuit thereafter performs the detection function until a block sync signal 22 is generated at one of the sync sequence unit times CT15 at the end of a detected sequence before being reset again.

Figure 4:
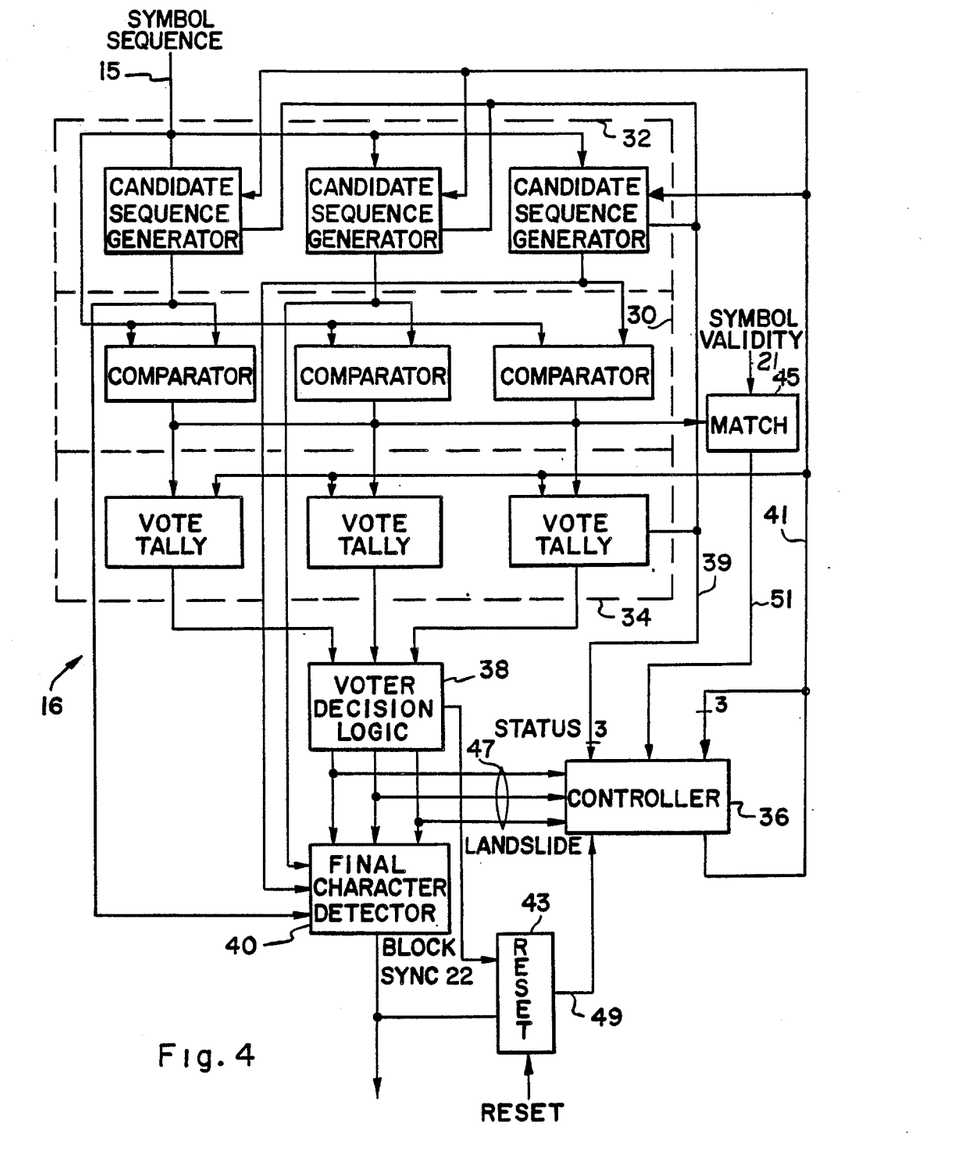
FIG. 4 is a detailed block diagram of the synchronization detection circuit illustrated in FIG. 1.

FIG. 4 illustrates a generalized detailed block diagram of the preferred implementation of the synchronization detection circuit 16. This circuit will now be more fully described to provide an overview of the method for detecting the synchronization sequence and generating the block sync signal 22.

The synchronization detection circuit 16 includes a controller 36 which receives timing signals and a plurality of status indications to control the loading of a plurality of candidate sequence generators 32 and the clearing of associated vote tally circuits 34. The controller 36 operates in a programmed sequence which is initiated with the receipt of the first valid symbol and, thereafter, steps through the program contained therein until an end of the synchronizing sequence is detected, or the controller is reset by a signal on a line 49 from a reset circuit 43. In general, the controller 36 determines from the outputs of a plurality of comparators 30 and a match circuit 45 whether or not to load a present symbol into one of the candidate sequence generators 32. Each comparator 30 compares the output of a corresponding candidate sequence generator 32 with the received symbol sequence on line 15 to output a match signal if the two are equivalent. The match circuit 45 generates a new candidate signal via line 51 to the controller 36 if no match be found and the symbol validity signal CL11 on line 21 indicates a valid symbol is present.

If none of the comparators 30 are indicating a match for a present symbol and that symbol is valid, then there is an ambiguity in the received sequence that must be resolved. When match circuit 45 produces a no match signal, the controller 36 will load the present symbol into an available candidate sequence generator 32, if any. The loading is controlled by signal lines 41 which determine which of the candidate sequence generators 32 are to be loaded with the present received symbol.

The lines 41 are also used to clear the vote tally circuit 34 associated with the loaded candidate sequence generator. The controller 36 also receives signals from voter decision logic 38 over lines 47 and from the candidate sequence generators 32 over lines 39; these signals identify the status of the candidate sequences. The status signals on lines 39 indicate when the last symbol of a sequence has been reached in one of the candidate sequence generators 32, and the status signals on lines 47 indicate when one of the candidate sequences has been selected as the most likely to be the transmitted sequence.

The candidate sequence generators 32 are used to generate that part of the predetermined transmitted sequence which is subsequent to a respective candidate symbol. The candidate sequence generators 32 therefore reproduce parts of the total transmitted sequence beginning with the particular candidate symbol loaded therein by controller 36 and ending with the last symbol in the predetermined sequence. Thus, if a candidate symbol is loaded into one of the candidate sequence generator 32 and has been correctly recovered, the output of the candidate sequence generator 32 will correspond exactly to the transmitted sequence in the predetermined synchronization pattern. For example, in a countdown sequence 6, 5, 4, 3, 2, 1, 0, if the symbol "5" be identified, that symbol is loaded into a respective candidate sequence generator 32, which then outputs the remainder of the sequence 4, 3, 2, 1, 0 at the proper times. Thus, if the symbol "5" were part of the transmitted sequence, the remainder of the transmitted sequence would match the output of the candidate sequence generator. However, this may not necessarily be the sequence which is received by the sync detection circuit 16 because of transmission errors.

The significance of being able to generate the subsequent symbols of a predetermined sequence from candidate symbols permits an arbitration system whereby errors in the received portion of the sequence after the recovered symbol can be ignored, if necessary. Thus, fewer valid symbols need be recovered to retain the ability to determine the end of the actual sequence. The controller 36 will load as many candidate symbols as there are ambiguities in the received symbol sequence and as there are available candidate sequence generators 32. In the preferred implementation shown in FIG. 4, the number of candidate sequence generators 32 is three, for a three candidate system. An increase in the number of candidate sequence generators 32 will increase the probability that one of the candidate symbols will correctly match a transmitted symbol.

Figure 8:
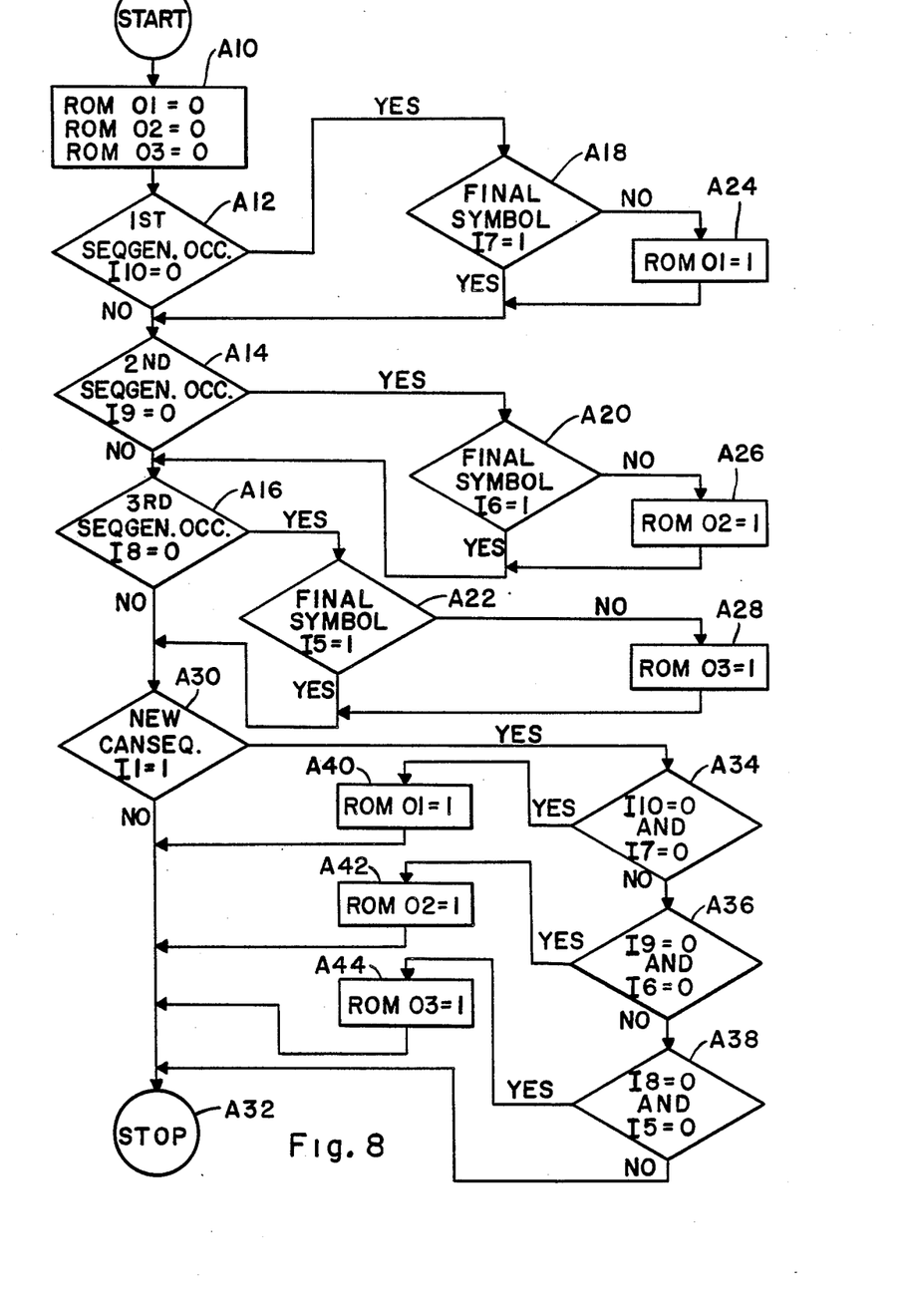
FIG. 8 is a detailed flowchart of the logic algorithm executed by the control means illustrated in FIG. 9.

There are many logic sequences and criteria which can be used to determine when a candidate symbol should be loaded into a candidate sequence generator 32 and when one should be cleared from the device. The preferred logic sequence performed by the controller 36 is illustrated in FIG. 8 and will be more fully explained hereinafter. In general, if an ambiguity exists, a currently received valid symbol becomes a new candidate. Valid candidate symbols are counted down in sequence to a final symbol and cleared from a counter 32 if the candidate sequence be not chosen before the final symbol is generated, i.e., it has failed as a candidate. In addition, if the current symbol be the final symbol of the transmitted sequence, it cannot receive any votes. Therefore, it will not be loaded into a counter 32 for the matching procedure. Other criteria can be used, such as the status of all the voter decision logic selection outputs.

The outputs of the candidate sequence generators 32 are each input to the respective associated comparators 30. The comparators 30 have as their other input the received symbol sequence from the line 15. A match between the incoming symbol sequence and a candidate sequence will produce the match signal or a vote for the candidate symbol which generated the match. These votes are tallied in respective vote tally circuits 34, and the tallies are transmitted to a voter decision logic circuit 38.

The voter decision logic circuit 38 is an arbitration circuit which decides on the basis of a logic algorithm and the tally outputs of the vote tally circuits 34 which candidate sequence, if any, to select as the most likely to represent the originally transmitted synchronization sequence. There are a multiplicity of algorithms by which a most likely candidate sequence can be selected on the basis of the vote tallies. However, in the implementation herein, a minimum vote total is used to select a preliminary winner and, if no other candidate sequence symbol has received more votes by the time that a preliminary winner sequence reaches its final symbol, then that candidate is selected to generate the block sync signal 22. Detection of a final symbol is achieved by a final character detector 40 to which the output of the selected sequence generator 32 is gated. Upon detection of the final symbol of the selected candidate sequence generator 32, the final character detector circuit 40 will output the block sync signal 22.

Figure 5:
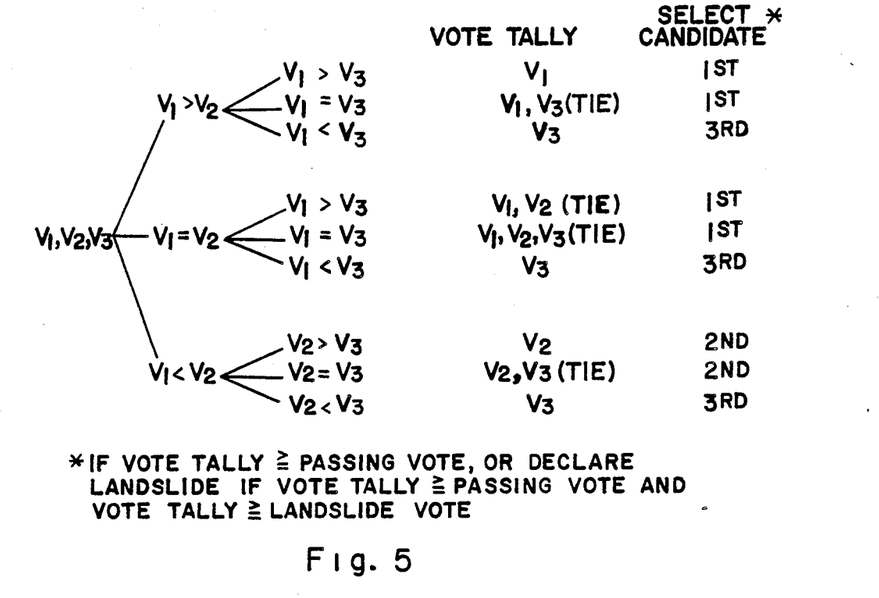
FIG. 5 is a logic diagram of the selection criteria algorithm executed by the voter decision logic of the synchronization detection circuit illustrated in FIG. 9.

FIG. 5 illustrates the preferred logic algorithm executed by the voter decision logic 38. V1 is the number of votes tallied for the first candidate, V2 is the number of votes tallied for the second candidate, and V3 is the number of votes tallied for the third candidate, as taken from the output of the vote tally circuits 34. The logic indicates which candidate should be chosen or selected based upon the tally of the votes for the respective candidates.

The selection of a candidate is based on a candidate sequence obtaining either a greater number of votes or at least an equal number of votes relative to the other candidates, and having a total vote count of at least a passing vote count. The passing vote count is the minimum number of votes that a candidate sequence must accumulate before being selected. Further, there may be another criterion where, if a candidate sequence tallies a number that is greater than or equal to a landslide count, then that candidate is selected. The landslide count is a number of votes that assures to a known probability that the candidate sequence is the transmitted sequence. For example, a number that is greater than any two candidates could obtain individually in a tie would be such a landslide count. In the case of a seven-trial system, the landslide vote count would be four. Other criteria can be used for a landslide number.

Depending on whether V1 is less than, equal to or greater than V2, and similarly for V3, the logic will select a candidate. For the case where V1 is greater than V2, V1 is also compared with V3 to determine whether it is greater than, equal to, or less than V3. The second candidate having been eliminated, this part of the logic determines whether the first or the third candidate will be selected based upon obtaining the greater number of votes. Upon a tie, the first candidate is selected over the third candidate. The first candidate is selected because the later candidate remains a candidate for selection against still later candidates and will supplant the earlier as a selected candidate. In the second condition where V1=V2, V1 is again compared with V3 to determine whether it is greater than, equal to, or less than V3. Ties are then settled by selecting the first candidate over later candidates. If V3 is greater than V1 for this condition, the third candidate is selected. Similarly, for the condition where V1 is less than V2, V2 is compared to V3 to determine whether it is greater than, equal to, or less than V3. As was the case previously, the determination will either select the second candidate or the third candidate, depending upon which is greater, or in the case of a tie, the second candidate will be chosen over the third candidate. The cases for a tie are decided in a somewhat arbitrary manner but it is believed selecting the prior candidate will increase the probability of detecting the correct sequence.

Figure 6:
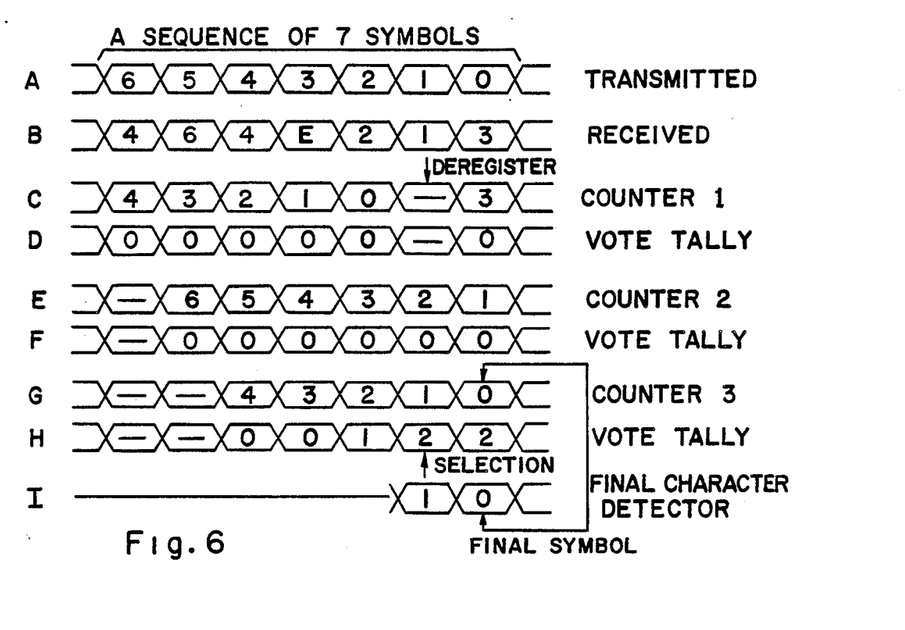
FIG. 6 is a timing diagram illustrating candidate voting in a synchronization detection circuit according to the invention.

FIG. 6 is a timing diagram illustrating a seven-trial, three-candidate, two-vote system. The sequence of symbols in the synchronization sequence will be the numerical symbols 0-6 and the sequence will be in the reverse numerical order, 6-5-4-3-2-1-0. The choice of these symbols and the sequence is to permit a particularly facile implementation of the above-discussed method. Line A of FIG. 4 illustrates the original sequence of transmitted symbols. Let us now assume that a synchronizing sequence of 4, 6, 4, E, 2, 1, 3 is recovered from a serial data stream of the transmission channel 8 and is applied to the synchronization detection circuit 16 as a plurality of symbols and timing signals. This reproduced sequence is illustrated on line B of FIG. 6. The symbol E indicates a character which has been recovered that is not within the symbol set; that is, it is known to be in error.

Line C of FIG. 6 illustrates the contents of a first candidate sequence generator 32. The contents of the vote tally circuit 34 associated with the first candidate sequence counter is illustrated immediately below the counter contents on line D. Similarly, on lines E and G, the contents of second and third candidate sequence generators 32 are illustrated and the contents of their associated vote tally circuits 34, are illustrated on lines F and H'. When referring to the first, second, and third candidate sequence generators what is meant is the order in which a candidate sequence generator is loaded with a candidate symbol. Because there are any number of different algorithms for loading the candidate generators, any of the candidate sequence generators 32 could be the first, second, or third candidate sequence generator.

When the initial received symbol "4" is entered in the first candidate sequence counter, it initializes a candidate sequence generation operation which follows the predetermined sequence. Therefore, the first candidate sequence generator counts down, starting with the symbol "4" and finishing the subsequent portion of the original predetermined sequence in the order "3-2-1-0" in correspondence with that sequence. The respective comparator for this candidate symbol compares each new incoming symbol of the reproduced sequence with those generated sequence symbols. It can be seen at line d of FIG. 6, because none of the recovered symbols match corresponding symbols generatgenenator on line c that by the first candidate sequence generated, the associated tally circuit will not register any votes for this candidate. When the first sequence generation circuit generates the final symbol "0" and no candidate has been selected, this candidate is then withdrawn deregistered by clearing the generator such that it becomes accessible for use by another subsequent candidate.

Because the second symbol "6 " in the recovered sequence on line B failed to match the second symbol 3 generated in the first candidate sequence, the symbol is ambiguous. The symbol "6 " therefore, becomes a second candidate entered into the second candidate sequence generator on line B. This causes the generation of the second candidate sequence 6-5-4-3-2-1-0 from the second candidate sequence generator. Likewise, the generated symbols the second candidate sequence generator are compared to the corresponding symbols subsequently recovered from the input sequence in timed order, and votes tallied for any matches.

The third symbol "4," recovered in the exemplary sequence on line B does not match either of the two possible candidates and thus no votes are tallied either for the first candidate or the second candidate. The symbol "4" caused an ambiguity because it does not match either candidate and will therefore, become the third candidate entered in a third candidate sequence generator illustrated on line G. There are now three candidates in the three sequence generators being matched with the input symbols. However, the fourth symbol "E" which is recovered is invalid and does not produce any votes for any of the three candidates. Further, the fourth symbol is not registered because it is invalid.

It is not until the fifth symbol "2" is recovered that there is a match, and a vote is tallied for the third candidate on line H. The sixth recovered symbol "1" will produce another vote for the third candidate. Because the symbols "1 and 2" provided a match and caused a vote, a new candidate will not be inserted or registered in the first candidate sequence generator. This is because no ambiguity has been found. The last symbol recovered, "3", does not provide a match or a vote, but the third candidate has collected two votes, which is greater than the vote of any other candidate and is equal to tallied for greater than the minimum passing vote count, which is two in this example. Therefore, this sequence is selected as the one most likely to be the transmitted sequence and is used to generate the block sync signal 22 as indicated by the final character detector and shown in line I. The symbol "3", not providing a match, will be inserted in the vacant first candidate sequence generator, as shown in line C.

Figure 7:
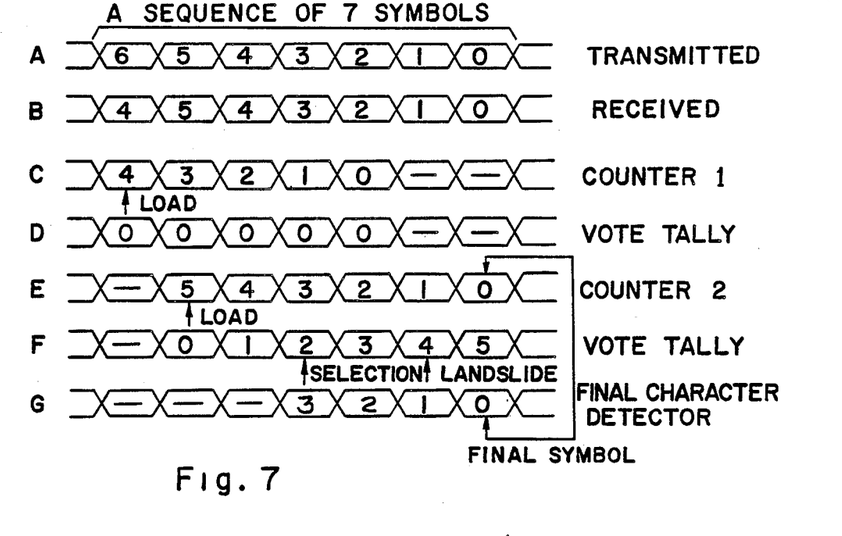
FIG. 7 is a timing diagram illustrating candidate voting for a landslide election in a synchronization detection circuit according to the invention.

FIG. 7 is an example of a similar seven-trial, three-candidate, two-vote system with a landslide criterion of four votes. Lines A, B illustrate the transmitted and received synchronizing sequences, respectively. Lines C, D illustrate the contents of the first candidate counter and its associated tally circuit, respectively. Lines E, F illustrate the contents of the second candidate counter and its associated tally circuit, respectively. The first received symbol "4" is loaded into the first candidate sequence generator and compared with the received sequence. Because there are no matches, the associated vote tally circuit accrues no votes for the candidate symbol as illustrated on line D. The second symbol "5" presenting an ambiguity because it dose not match the first candidate sequence, becomes a second candidate and is loaded into the second candidate counter on line E. The subsequently received sequence match the second generated candidate sequence symbols and, thus, votes continue to accrue for this candidate on line F. No other candidates are selected because there are no further ambiguities in the input sequence.

When a landslide number of votes (four) have accrued for the second candidate, it is selected as the most likely candidate, and its last symbol is used to generate the block sync signal 22. It should be noted that by definition the second candidate has passed the minimum passing vote count and has the greatest count from among the possible candidates. The landslide condition is declared and the candidate sequence selection is terminated when the selected candidate sequence reaches the final symbol.

Figure 9:
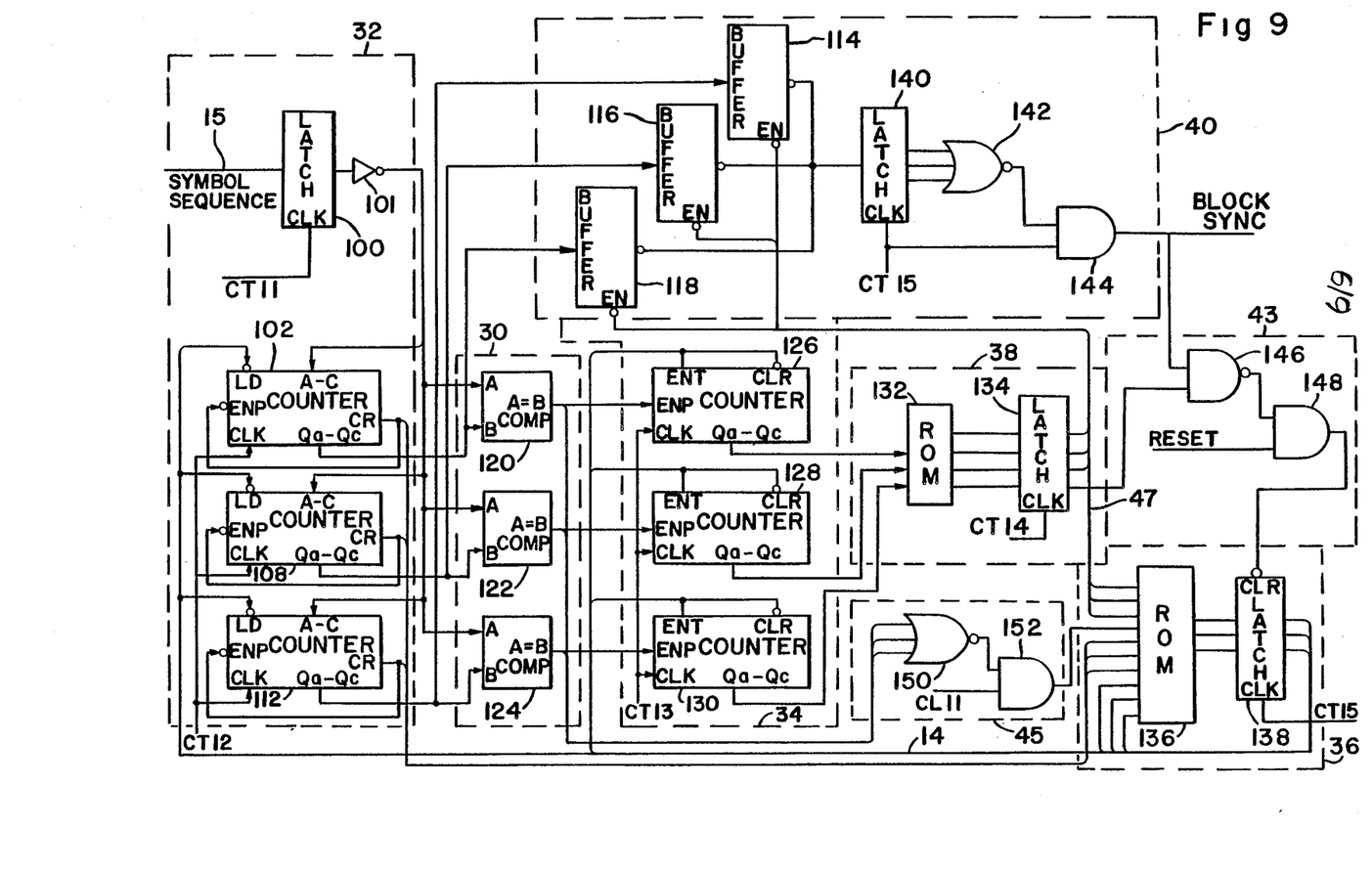
FIG. 9 is a detailed electrical schematic diagram of the synchronization detection circuit illustrated in FIG. 4.

FIG. 9 is a detailed circuit schematic of an implementation of the synchronization detection circuit 16 included in a preferred embodiment of the invention. Each of the candidate sequence generators 32 is implemented by a four bit binary candidate counter 102, 108 and 112, respectively. This allows a candidate sequence to be generated easily by clocking a candidate counter with a signal which is synchronous with the recovered symbol sequence. The counters 102, 108 and 112 count synchronously with the clock signal CT12 which is generated in synchronism with the symbol sequence input on line 15.

The recovered symbol sequence on line 15 is input to a clocked latch 100 which receives the symbol sequence as three parallel bits at the word sync timing rate. The symbols are clocked into the latch 100 by the timing signal CT11. The latch 100 has its output inverted in an inverter 101 and thereafter presents the symbols to the preset inputs A-C of each the candidate counters 102, 108 and 112. Because of the inversion of the symbols, the counters 102, 108, and 112 actually count up (9-10-11-12-13-14-15)for a count down sequence of 6-5-4-3-2-1-0. A carry signal indicating the last symbol O of a candidate sequence is generated by the carry output CR of each counter when it overflows after a count of 15. The carry signal further disables the counter by applying a high level signal to its pulse enable input ENP.

The received symbols on line 15 are further input to the A inputs of comparators 120, 122 and 124. The comparators 120, 122 and 124 are asynchronous and have their B outputs connected respectively to the outputs Qa-Qc. of the candidate counters 102, 108 and 112. The A=B outputs of the comparators 120, 122 and 124 generate a match or vote signal for the incoming symbols of the received sequence and one of the respective outputs of the candidate counters 102, 108 and 112. When a match occurs, the A=B outputs of the comparators 120, 122 and 124 enable the enable pulse inputs ENP of the vote counters 126, 128 and 130, respectively. The clocking signal CT13 is generated to the CLK input of the counters 126, 128 and 130 to allow an incrementation of their count when their ENP inputs are enabled from the comparators 120, 122 and 124 respectively.

Figures 10, 11:
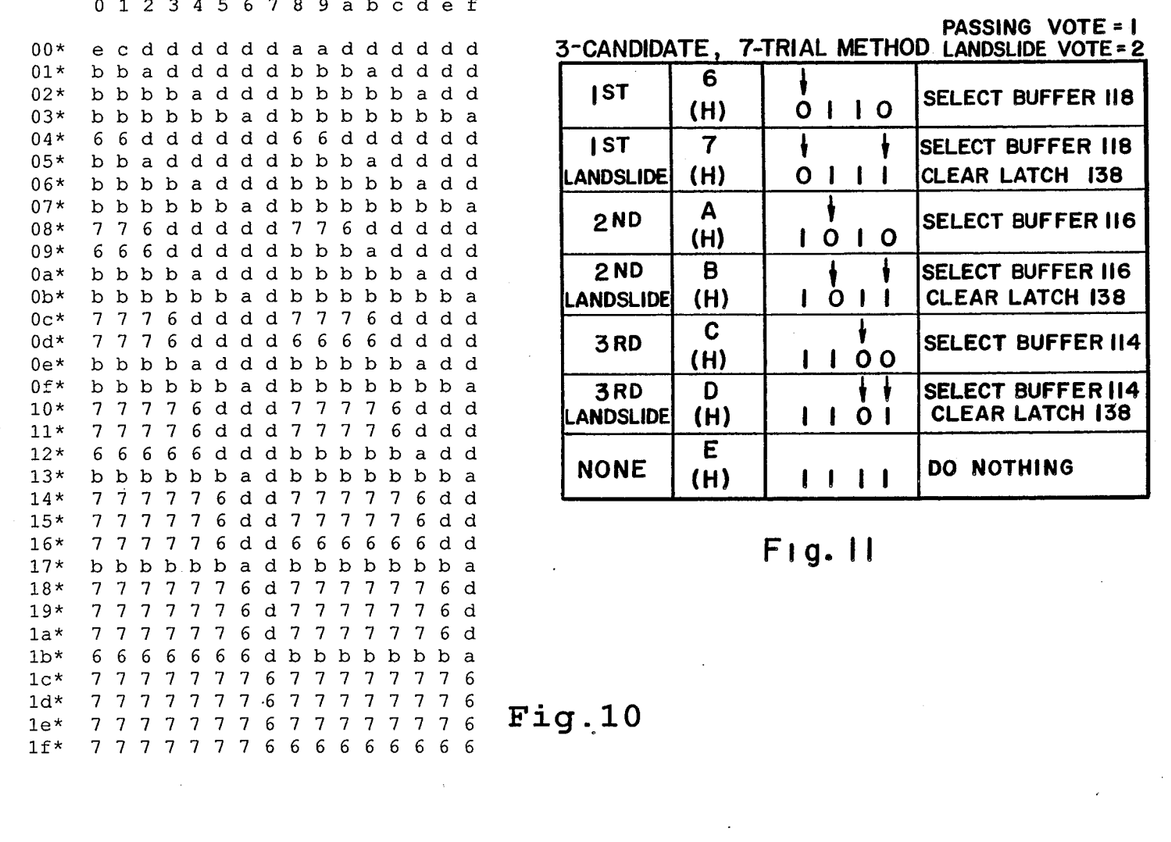
FIG. 10 is a representation of the contents of the ROM for the voter decision logic illustrated in FIG. 9.
FIG. 11 is a representative table illustrating the functions controlled by the output of the ROM for the voter decision logic illustrated in FIG. 9.

The outputs Qa-Qc of the vote counters 126, 128 and 130 are input to the voter decision logic 38. The voter decision logic 38 comprises a ROM 132 and a latch 134. The ROM 132 receives the accumulated vote total from of the vote counters 126, 128 and 130 as an address and processes the votes by the outputting of the contents of the location addressed to implement the programmed logic described previously with reference to FIG. 5. The ROM 132 is a 512×4 bit device and its contents are illustrated in FIG. 10.

Upon the application of the nine bit address from the three vote counters 126, 128 and 130, the ROM 132 outputs a 4 bit control word depending upon that address. The control word is clocked into the latch 134 in synchronism with the timing signal CT14. These 4 bits become three candidate selection signals to a multiplexer of the final character detector 40 and a landslide indication signal to the reset circuit 43. Each candidate selection signal enables a respective inverting buffer 114, 116 and 118 forming the multiplexer to pass the symbols of a selected candidate sequence through it and into a latch 140. The selected sequence symbol which is latched into the latch 140 enters the device in synchronism with the timing signal CT15 applied to the CLK input of the device. The control selection outputs of the latch 134 and their functional operations are more fully illustrated in the table shown in FIG. 11.

At the end of a selected candidate sequence, the final character will be generated and detected by a NOR gate 142 decoding a "0". Decoding this symbol or number will cause the output of gate 142 to enable gate 144 and pass the clock pulse signal CT15 which becomes the block sync signal 22.

Figure 12:
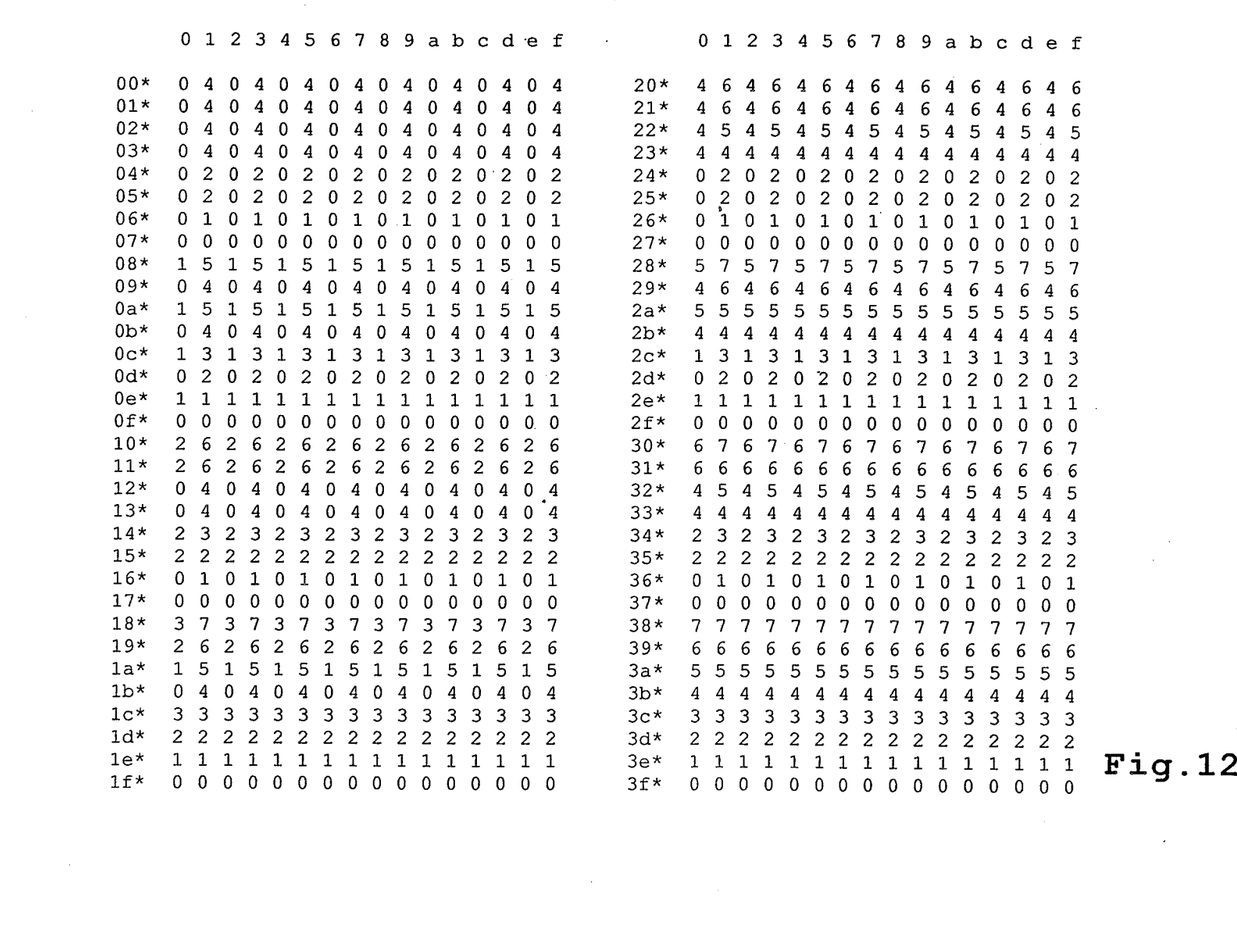
FIG. 12 is a representation of the contents of the ROM for the control means illustrated in FIG. 9.
Figure 13:
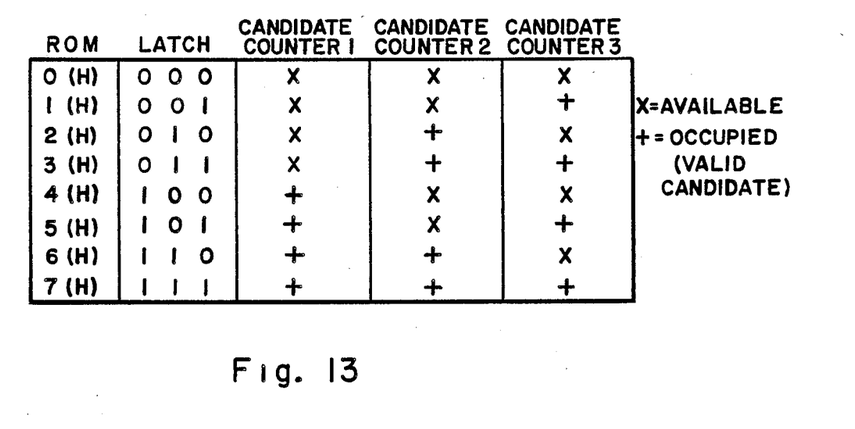
FIG. 13 is a representative table illustrating the functions controlled by the output of the ROM for the control means illustrated in FIG. 9.

The loading of the candidate counters 102, 108 and 112 with candidate symbols and the clearing of the vote counters 126, 128 and 130 are handled by the controller 36. The controller 36 is comprised of a ROM 136 and a clocked latch 138. The ROM has 10 address inputs (only 3 being used) (1028) and a 4 bit output. The program contained within the ROM 136 is more fully illustrated in FIG. 12, which illustrates the contents of the 1028×4 bit memory space. There of the address inputs of the ROM 136 are the three candidate selection lines 47 from the latch 134. These lines indicate which of the candidates, if any, has been selected. Three other inputs of the ROM 136 are from the carry outputs CR of the condidale counters 102, 108 and 112. The carry output signals are a status indication that a counter has reached the last symbol "0 " in the predetermined sequence and, thus, has overflowed and generated a carry signal. Further, input is made to the ROM 136 from the three candidate loading lines 41, which are the outputs of the latch 138. These lines indicate the status of the output of ROM 136 one symbol time period earlier.

The last input to the ROM 136 is from the match circuit 45 which detects the lack of any match by a NOR gate 150 and provides this signal to the an input of the ROM 136. This no-match, signal is gated through an AND gate 152, provided the symbol validity signal CL11 is at a high level. The symbol validity signal CL11 is generated from the validity checker 14 (FIG. 1) to indicate that the no-match signal has occurred in response to a valid symbol. If the validity checker 14 finds an invalid symbol, then the symbol validity signal CL11 15 pulled low to disable the gate 152 and block the passage of the no-match signal from the NOR gate 150. This prevents an invalid symbol from being input to a candidate counter and from generating an invalid candidate sequence. An invalid symbol cannot be merely ignored because the candidate sequences should be counted down every symbol period, even for an invalid received symbol.

The ROM 136 receives these ten inputs as an address and produces 3 bits of output from the contents of the addressed location (the fourth bit is not used). The 3 bits of output from the ROM 136 are clocked into the latch 138 in synchronism with the timing signal CT15 and become the signals which load the symbols from the input symbol sequence into the candidate counters 102, 108 and 112. Further, they clear the associated vote counters 126, 128 and 130 simultaneously with the loading of a symbol.

The logic diagram in FIG. 8 will now be more fully explained. The program commences at block A10 by tentatively setting the outputs 01, 02 and 03 of the ROM 136 to zero. The program then executes a series of tests to determine if the sequence generators, namely, candidate counters 102, 108 and 112 are occupied in generating candidate sequences, whether the candidate sequences have reached their final counts, and which, if any, candidate of the candidates counter available to commence generation of a new candidate sequence. These tests determine if any of the tentative zero settings should be changed to ones before they are output. First, inputs I10, I9 and I8 to ROM 136 are tested in sequence at blocks A12, A14 and A16 respectively to determine whether the candidate counters 112, 108 and 102 have previously commenced generation of candidate sequences. I10, I9, and I8 are from the outputs of the latch 138 in FIG. 9. A logic state of one at an input to ROM 136 signifies a respective candidate counter has previously commenced such generation. In the event a test indicates a candidate counter has previously commenced the generation of a candidate sequence, the program branches to a second test to determine whether the previously generated candidate sequence has reached its final count. For this purpose, each of the three tests at blocks A12, A14 and A16 is branches to one of the three tests in blocks A18, A20 and A22, respectively. The inputs I7, I6, and I5 are from the carry CR outputs of the respective candidate counters 102, 108, and 112. Each branch involves the execution of a series of similar program steps, with each of the series performed with respect to one of the candidate counters. For example, if the test at block A12 indicates the corresponding candidate counter has previously commenced generation of a candidate sequence (I10Z), block A18 tests the input I7 to ROM 136 to determine if the candidate sequence of the first sequence generator has reached its final count. If the test is affirmative, delected by a logic state of one at input I7, the candidate counter is prepared to commence generation of a new candidate sequence in response to a subsequently received valid symbol in the received data by leaving the output 03 cleared. The program then returns to block A14 to execute the next test to determine if another candidate counter has previously commenced generation of a candidate sequence. If, however, the test executed at block A18 is negative, i.e., the input I7 to ROM 136 is not one, the program branches to block A24 to set the output 03 of ROM 136 to one. These operations prepare the corresponding candidate counters to continue generation of their respective candidate sequences.

The program continues at block A14 to test whether a second of the three candidate counter is occupied in the generation of a candidate sequence. If such candidate counter is so occupied, the program branches to the test at block A20 determine whether the sequence being generated by the counter has reached its final count. Such final count is signified by a logic one at input I6 to the ROM 136. In the manner previously described in reference to block A18, this test determines the manner in which the corresponding counter is prepared for operation in response to a subsequently received valid symbol. If the candidate counter is finished with the generation of its candidate sequence, and it returns to block A16 thereby leaving the output 02 at zero. Otherwise, the program branches to block A26 where a logic one is placed at output 02 of the ROM 136.

In any event, the program then continues to execute the functions of the block A16, A22 and A28 to determine whether the third candidate counter is occupied in the generation of a candidate sequence and, if so, to determine whether the candidate sequence has reached its final count. If the counter has reached the final count, it is prepared for response to subsequently received valid symbols.

Following the determination of the candidate sequence generation states of the counters and their preparation for response to subsequently received valid symbols, the program continues to determine whether a new count sequence should be commenced with such symbol. This is determined by the test of inputs I1 performed at block A30. Input I1 is from the output of the matching circuit 45. If the input I1 to ROM 136 is a logic zero, the test will signify that a new candidate sequence should not not commenced and the program continues to block A32 and terminates. However, if a logic one is present at input I1 to ROM 136, the test will signify that a new candidate sequence is to be commenced. Whether or not such sequence can be commenced depends on the availability of one of the candidate counters. To determine this, the program branches to execute a sequence of tests at blocks A34, A36 and A38. Each of these tests determines whether or not a corresponding candidate counter is occupied in generating a candidate sequence and whether it has reached its final count. If inputs I7 and I10 to ROM 136 are both zero, this signifies that the corresponding counter is not occupied in generating a candidate sequence. Similarly, if inputs I6 and I9 and inputs I5 and I8 of the ROM 136 are logic zero, the respective corresponding counters are also not occupied in generating candidate sequences. The program proceeds to select the first candidate counter found not to be so occupied. Each of the tests at blocks A34, A36 and A38 define a respective branch to one of the blocks A40, A42 or A44. Each of these blocks represents the execution of a program step that conditions one of the outputs 01, 02, or 03 of ROM 136 to enable the corresponding candidate counter to commence a new candidate sequence in response to a received valid symbol. This conditioning is effected by setting the appropriate output of ROM 136 to logic 1.

Returning now to FIG. 9 the reset circuit 43 acts to reset the controller 36 by clearing the latch 138 with a low level logic signal on line 49. This action will clean all the candidate counters 102, 108, and 112 and vote counters 126, 128, and 130. The reset signal to the latch 138 is generated as a low level logic pulse from either the output of NAND gate 146 or the intialization signal Reset through the AND gate 148, which acts as a negative true OR gate. The Reset signal is from the word sync detector 10 (FIG. 1) and is generated to begin the cycle of detecting a synchronization sequence. The output of gate and 144, which generates the block sync signal 22, is normally at a low logic level and produces a high level pulse at the time of the decoding of the last symbol "0" concidently with clock signal CT15. If the landslide signal is at a high level, then the block sync signal, when it makes a transition to a high level, will produce a pulse from the NAND gate 146 similar to the Reset signal to clear the latch 138.

The vote decision logic criterion illustrated in FIG. 10, for example, has a passing criterion of one vote and a landslide criterion of two votes. Therefore, in the presently implemented system of FIG. 9, a block sync signal 22 is generated for every candidate sequence which reaches its last symbol with at least one vote, and more votes (or a tie resolved in its favor) than any other candidate. Other candidate sequence with at least one vote reaching a last symbol subsequently can further generate block sync signals 22 unless a another candidate has accrued two votes (a landslide) at which time the latch 138 is reset. The utilization device will be equipped with circuitry to determine which of the block sync signals to use for data recovery, as by resetting to the last generated block sync signal 22.

While a preferred embodiment of the invention has been illustrated, it will be obvious to those skilled in the art that various modifications and changes may be made thereto without departing from the spirit and scope of the invention.

What is claimed is:

1. Apparatus for generating a synchronizing pulse the time position of which is indicative of the start of a data block in a transmitted data stream having a predefined sequence of N different predefined symbols preceding the data block, N being an integer greater than 2, said apparatus comprising:
   means for identifying said predefined symbols in a received data stream;
   a plurality of candidate means for generating respective candidate sequences of candidate symbols corresponding to symbols in said predefined sequence starting with a selected one of said predefined symbols and in synchronism with symbols in the received data stream;
   means for comparing each identified predefined symbol with said candidate symbols currently generated by said candidate means and for generating a match signal in respect to any candidate means the output of which matches the respective identified symbol;
   tally means for separately tallying the number of match signals for each candidate means;
   means responsive to the number of match signals tallied for respective said candidate means for generating a selection signal identifying a respective selected candidate sequence;
   means responsive to said selection signal for generating said synchronizing pulse in timed relation to the generation of the last symbol of said selected candidate sequence; and
   control means responsive to said match signals and the status of respective ones of said plurality of candidate means for loading a starting candidate signal corresponding to said predefined symbol currently identified into respective said candidate means not occupied in generating a candidate sequence and for clearing corresponding said tally means.

2. Apparatus as set forth in claim 1 wherein each of said candidate means includes:
   a presettable candidate counter which counts in said predefined sequence and which can be preset to correspond to any of said candidate symbols; and
   said candidate counter having a count output corresponding to said candidate symbols according to said candidate sequence and a carry output which generates a carry signal when the last candidate symbol in the candidate sequence is reached.

3. Apparatus as set forth in claim 2 wherein said tally means includes:
   a plurality of vote counters each associated with a respective candidate counter, each said vote counter being incremented every time said match signal is generated for the respective candidate counter.

4. Apparatus as set forth in claim 3 wherein said means for generating said synchronizing pulse includes:
   multiplexer means having a plurality of channels connected to the outputs of said candidate counters and responsive to said selection signal for enabling one of said channels;
   decoding means for generating an enabling signal when the last symbol of a said sequence from said selected candidate counter is detected; and
   means responsive to said enabling signal for outputting a synchronizing pulse at a predetermined time relative thereto.

5. Apparatus as set forth in claim 4 wherein said means for generating said selection signal includes:
   a read only memory with a plurality of addressable locations containing control words, said read only memory being addressed with the count outputs of said vote counters and applying the control word contained in that location to said multiplexer means, said multiplexer means selecting the said channel associated with a respective candidate counter according to said applied control word.

6. Apparatus as set forth in claim 5 wherein said control means includes:
   a read only memory with a plurality of addressable locations containing control words, said read only memory being addressed with control words from said selection signal applying means, said carry outputs of said candidate counters, and its previous control word output, and generating the control word contained in that location to said candidate counters and said vote counters, said control word causing the loading of one of said presettable candidate counters with the candidate symbol corresponding to said predefined symbol currently identified and causing the resetting of the respective vote counter when it reaches the end of the respective candidate sequence.

7. A method for synchronizing the timing of a data stream utilizing N different predefined symbols in a predefined sequence upstream of a data block to be synchronized, N being an integer greater than 2, said method comprising the steps of:
   identifying said predefined symbols in a received data stream;
   generating candidate sequences of candidate symbols corresponding to symbols in said predefined sequence starting with respective selected candidate symbols;
   comparing each identified symbol with the respective temporally corresponding symbol of each respective said candidate sequence and generating respective match signals when the respective symbols match;
   starting said generating of a said candidate sequence with a candidate symbol corresponding to a current said predefined symbol when the current said predefined symbol does not match a respective temporally corresponding symbol;
   tallying the number of match signals for each candidate sequence;
   selecting one of said candidate sequences as likely to correspond to the transmitted sequence by comparing the number of matches tallied for respective said candidate sequences; and synchronizing said data block relative to a time identified by the end of said selected candidate sequence.

8. The method as set forth in claim 7 wherein said step of selecting includes:

comparing the number of matches tallied for respective said candidate sequences; and selecting the candidate sequence with the greatest number of tallied matches.

9. The method as set forth in claim 8 wherein said step of selecting further includes:

selecting the candidate sequence with the greatest number of tallied matches when the number of matches exceeds a minimum number.

10. The method as set forth in claim 9 wherein said step of selecting further includes:

selecting the candidate sequence with the greatest number of tallied matches, when the number equals a predetermined landslide number which is greater than said minimum number.

11. The method as set forth in claim 8 wherein said step of selecting includes:

in the event a plurality of candidate sequences have an equal number of votes and such number is greater than the number of votes for any other candidate; and selecting one of said candidate sequences according to a selected order of generation of said candidate sequences.

12. The method as set forth in claim 11 wherein said equal number exceeds a minimum number.

13. The method as set forth in claim 7 wherein said step of generating includes:

generating a candidate sequence, starting with the candidate symbol corresponding to a currently identified predefined symbol, when said currently identified symbol does not match a candidate symbol of a previous candidate sequence.

14. The method as set forth in claim 13 wherein the step of generating includes:

loading a selected candidate symbol into a predetermined number of candidate sequence generators to generate respective said candidate sequences; and determining from status indications the availability of said candidate sequence generators for said loading.

15. The method as set forth in claim 13 wherein said step of generating includes:

sequentially scanning a plurality of candidate sequence generators to determine which are not occupied in generating a candidate sequence;

loading a respective said selected candidate symbol into at least the first candidate sequence generator in said scan sequence not occupied in generating a candidate sequence ; and generating a respective said candidate sequence from said loaded candidate sequence generator.

* * * * *